F. FISHER.
ARMORED PNEUMATIC TIRE.
APPLICATION FILED JAN. 28, 1919.
1,315,598.
Patented Sept. 9, 1919.
2 SHEETS—SHEET 1.
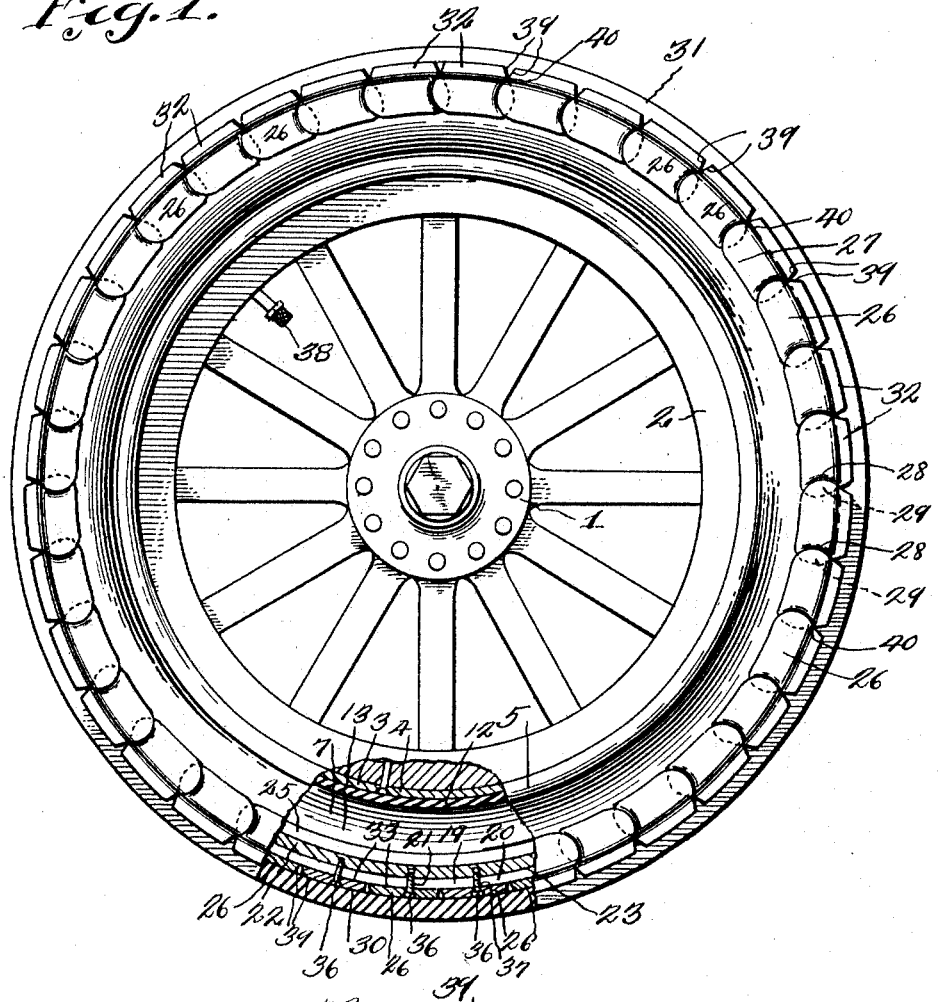
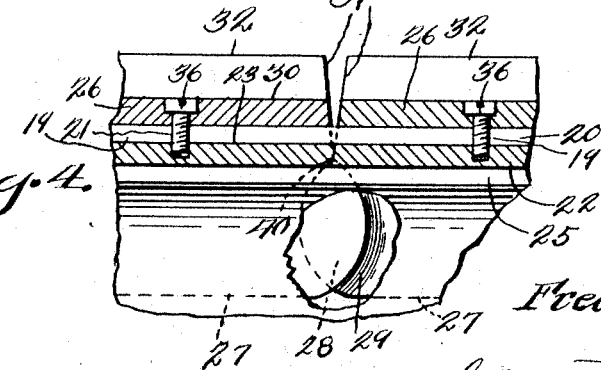
Inventor
Fred Fisher
By Philip A. H. Seull
his Attorney

F. FISHER.
ARMORED PNEUMATIC TIRE.
APPLICATION FILED JAN. 28, 1919.

1,315,598.

Patented Sept. 9, 1919.
2 SHEETS—SHEET 2.

Inventor
Fred Fisher

By Philip A. Y. Surell
Attorney

UNITED STATES PATENT OFFICE.

FRED FISHER, OF IRONTON, MISSOURI.

ARMORED PNEUMATIC TIRE.

1,315,598.  Specification of Letters Patent.  Patented Sept. 9, 1919.

Application filed January 28, 1919. Serial No. 273,535.

*To all whom it may concern:*

Be it known that I, FRED FISHER, a citizen of the United States of America, residing at Ironton, in the county of Iron and State of Missouri, have invented certain new and useful Improvements in Armored Pneumatic Tires, of which the following is a specification, reference being had therein to the accompanying drawing.

The invention relates to pneumatic tires and has for its object to provide a tire of the pneumatic type, wherein the use of an inner tube is eliminated and also exteriorly armoring whereby the puncturing of the tire is prevented.

A further object is to provide a tubeless pneumatic tire, wherein only one tube is used, this tube being provided with a circumferential slot on its periphery, thereby allowing the placing of a spring ring within the tire, said ring having means whereby the circumferential peripheral edges of the slot in the tire tube will be securely clamped in recesses of overlapping metallic armoring plates which cover the tread of the tire so as to prevent puncturing of the tire and to provide means connecting the overlapping armoring plates to the annular spring ring, whereby the armoring plates may be securely fastened to the spring ring and the edges of the severed portions of the tire securely clamped so as to prevent leaking of air through the circumferential slit in the tire. Also to provide the overlapping armoring plates with means for receiving a solid rubber tire, which prevents the contact of the overlapping armoring plates with the ground and also increases the resiliency of the tire as a whole.

With the above and other objects in view, the invention consists of the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of a conventional form of automobile wheel, showing the armored tire applied thereto, part of the tire being broken away.

Fig. 4 is a detail sectional view of the adjacent ends of two of the armoring plates.

Figure 2:
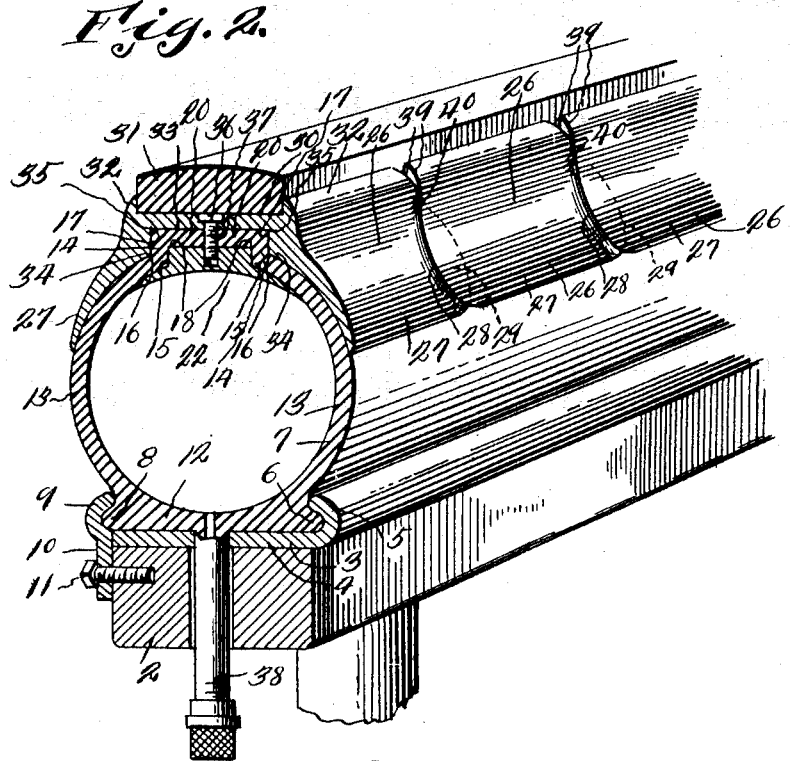
Fig. 2 is a perspective view of a portion of the tire.
Figure 3:
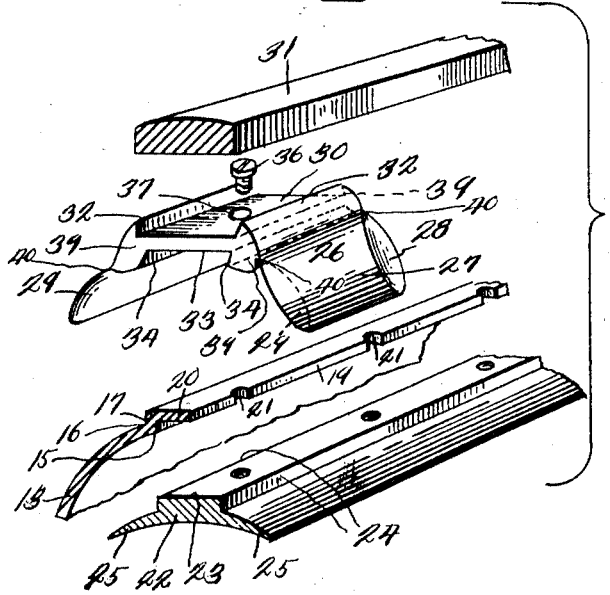
Fig. 3 is a collective detail view of the armoring plate, spring ring and securing means, showing them in position for placing together and clamping their adjacent parts.

Referring to the drawings the numeral 1 designates a conventional form of automobile wheel and 2 the felly thereof. Secured to the felly by any suitable means is the usual clencher rim 4, which is provided with the inturned portion 5 which engages the bead 6 of the tire 7. The other bead 8 of the tire receives the inturned portion 9 of a removable ring 10, which is secured to the side of the felly by means of the bolts 11. However the rim structure and the securing means for the tire may be of any construction.

The tire 7 comprises the base 12 and side portions 13 which are substantially of the same shape of the sides of pneumatic tires as at present used. However the sides of the tire extend outwardly as at 14 thereby forming shoulders 15 and recesses 16. The edges of the sides are then bent inwardly toward the center of the tread so as to form the shoulders 17 and recesses 18, the edges 19 of the portions 20 formed by the inward bending of the sides 13 being adapted to engage each other; however they are provided with semicircular recesses which register when the edges 19 are brought together, these recesses being designated by the numeral 21. Thus it will be seen that by providing the tire with a peripheral slit circumferentially of its tread, that it will be possible to place annular spring ring 22 on the inside of the tire. This spring ring 22 is provided with an annular rib 23 on its outer periphery, said rib 23 having shoulders 24, which are adapted to engage the recesses 18 of the sides of the tire when the ring is in position within the same. The ring 22 is also provided with flanges 25 which, when the ring is in position within the tire engage the inner surface of the tire.

The armor of the tire comprises a series of overlapping plates 26. Each plate 26 is provided with side flanges 27 which extend around the sides of the tire and protect the same from puncturing. However the flanges 27 are provided at one of their ends with depressions 28 located on the outside thereof, their other ends being provided with depressions 29 which are located on the inner surface of the flanges. By this construction it will be seen that depressions 28 and 29 will register when the plates are arranged on the tread of the tire. The plates 26 are provided with channels 30, which register when the plates are in position on the tire and are adapted to receive a solid rubber tire 31 between the flanges 32 formed by the channel 30. The under surface of each plate 26 is provided with a channel 33; these channels of each plate when the plates are arranged on the tire form a circumferential channel which receives the portions 20 of the edges of the sides of the tire. Shoulders 34, which are formed by the channels 33 of each plate 26 engage the recesses 16 of the sides of the tire, while the shoulders 17 engage the corners 35 of the channel 33. It will be seen that when the screws 36 which pass through apertures 27 in each plate 26 and screw into the spring ring 22, are set upon that channels of the various plates will force the portions 20 of the sides of the tire down upon the annular rib 23 and securely clamp the adjacent edges of the sides of the tire in the channels 33 of each plate so that the escape of air from the tire is prevented when the same is inflated, which inflating is accomplished by means of a conventional form of tire inflating valve 38.

Each plate 26 has its corners beveled off as at 39 in such a manner that the contacting points 40 between the plates 26, will be substantially in alinement with the center of the band forming the spring ring 22, this positioning of the contacting points between the plates being necessary so that they will not interfere with the flexing action of the spring ring 22.

It will be seen that an exteriorly armored tire is provided, wherein the necessity of using an inner tube is obviated, also one wherein the puncturing of the tire is reduced to a minimum. By the use of an annular spring ring within the tire the necessity of extreme air pressure in the tire is eliminated, for the reason that said spring ring furnishes the resiliency of the tire to a certain extent.

The invention having been set forth what is claimed as new and useful is:—

1. An armored pneumatic tire, comprising a body portion adapted to be secured to a wheel felly, said tire being provided with a circumferential peripheral slit, a spring ring within the tire and engaging the adjacent edges of the split, a series of overlapping metallic armoring plates engaging the tread of the tire and means connecting the overlapping plates and the spring ring within the tire so that the adjacent edges of the split of the tread of the tire may be clamped thereby preventing escape of air from the tire when inflated.

2. An armored pneumatic tire comprising a body portion adapted to be secured to a wheel felly, said tire being provided with a circumferential peripheral slit, a spring ring within the tire and engaging the adjacent edges of the split, a series of overlapping metallic armoring plates engaging the tread of the tire, said plates having their overlapping portions merging into beveled off corners so as to form contacting points between the plates, said contacting points being substantially in central alinement with the center of the band forming the spring ring and means connecting the plates and the spring ring for clamping the edges of the split of the tire so as to prevent escape of air from the tire when the same is inflated.

3. An armored pneumatic tire comprising a body portion, a spring ring within said body portion and provided with an annular rib adapted to register with an annular channel formed by channels in a series of armoring plates on the outside of the body portion and means carried by the armoring plates whereby the rib of the spring ring will clamp the tread of the tire between shoulders of the annular rib and corners formed by the channels of the armoring plates.

4. An armored pnuematic tire comprising a body portion, a spring ring within said body portion and provided with an annular rib, armoring plates having channels on their under surfaces, clamping means between the plates and the spring ring, channels in the plates for the reception of a solid rubber tire, said armoring plates contacting with each other at a point in central alinement with the center of the band forming the spring ring thereby allowing said ring to flex as the tire moves over the ground.

In testimony whereof I hereunto affix my signature.

FRED FISHER.